United States Patent
Vijay

(10) Patent No.: US 11,485,636 B2
(45) Date of Patent: Nov. 1, 2022

(54) PROCESS

(71) Applicant: BOREALIS AG, Vienna (AT)

(72) Inventor: Sameer Vijay, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/971,846

(22) PCT Filed: Feb. 22, 2019

(86) PCT No.: PCT/EP2019/054473
§ 371 (c)(1),
(2) Date: Aug. 21, 2020

(87) PCT Pub. No.: WO2019/162456
PCT Pub. Date: Aug. 29, 2019

(65) Prior Publication Data
US 2021/0009414 A1 Jan. 14, 2021

(30) Foreign Application Priority Data

Feb. 22, 2018 (EP) .................................. 18158051

(51) Int. Cl.
*C01B 3/50* (2006.01)
*C08F 2/01* (2006.01)
(Continued)

(52) U.S. Cl.
CPC ................ *C01B 3/501* (2013.01); *C08F 2/01* (2013.01); *C08F 2/06* (2013.01); *C08F 4/42* (2013.01);
(Continued)

(58) Field of Classification Search
CPC ... C01B 3/501; C01B 2203/0405; C08F 2/01; C08F 2/06; C08F 4/42; C08F 10/02; C08F 210/16
(Continued)

(56) References Cited

U.S. PATENT DOCUMENTS 4,200,714 A * 4/1980 Mahoney .................. C08F 6/24
526/68
4,740,550 A * 4/1988 Foster ................. C08F 297/083
525/243
(Continued)

FOREIGN PATENT DOCUMENTS

CN 107098991 A 8/2017
EP 0905153 A 3/1999
(Continued)

OTHER PUBLICATIONS

International Search Report and Written Opinion in PCT/EP2019/054473. dated May 8, 2019. 12 pages.

*Primary Examiner* — Rip A Lee
(74) *Attorney, Agent, or Firm* — Meunier Carlin & Curfman LLC

(57) ABSTRACT

The invention provides a process for separating hydrogen from a gaseous feed stream in a polymerisation process, comprising the steps i) polymerising an olefin monomer and optionally at least one olefin comonomer, in the presence of a solvent optionally in the presence of hydrogen, so as to form a polymerisation reaction mixture comprising a polyolefin polymer, unreacted monomer(s), solvent and hydrogen; ii) separating said polyolefin polymer from said unreacted monomer(s), solvent and hydrogen; iii) feeding said unreacted monomer(s) and hydrogen to a condenser so as to form said gaseous feed stream; iv) contacting said gaseous feed stream with a hydrogen separating membrane so as to form a hydrogen-rich gaseous stream and a hydrogen-lean gaseous stream.

13 Claims, 1 Drawing Sheet

Figure 1:
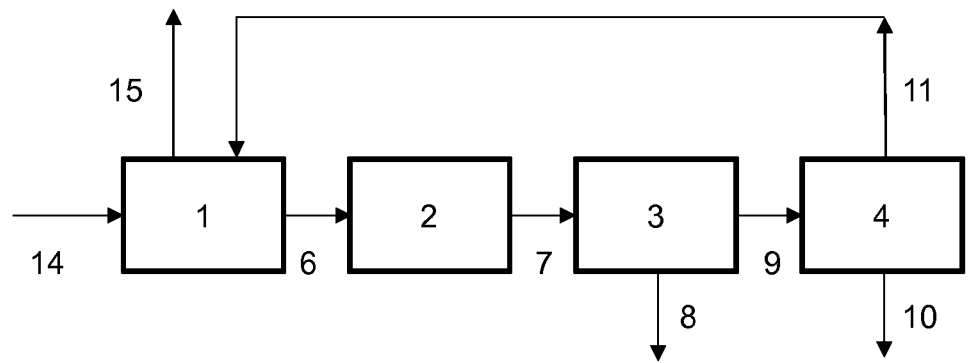

(51) Int. Cl.
*C08F 10/02* (2006.01)
*C08F 210/16* (2006.01)
*C08F 2/06* (2006.01)
*C08F 4/42* (2006.01)

(52) U.S. Cl.
CPC ............ *C08F 10/02* (2013.01); *C08F 210/16* (2013.01); *C01B 2203/0405* (2013.01)

(58) Field of Classification Search
USPC .............................................................. 95/55
See application file for complete search history.

(56) References Cited

U.S. PATENT DOCUMENTS

| | | | | |
|---|---|---|---|---|
| 4,880,441 | A * | 11/1989 | Kesting | B01D 53/22 95/55 |
| 6,288,178 | B1 * | 9/2001 | Jacobsen | C01B 3/501 526/67 |
| 6,455,643 | B1 * | 9/2002 | Harlin | C08F 10/06 525/240 |
| 6,559,348 | B1 * | 5/2003 | Aittamaa | C08F 6/001 95/55 |
| 7,497,896 | B2 * | 3/2009 | Bromet | B01D 53/22 95/55 |
| 9,000,106 | B2 * | 4/2015 | Lawson | C08F 2/01 526/905 |
| 9,034,995 | B2 * | 5/2015 | Yang | C08F 6/001 526/348 |
| 9,469,582 | B2 * | 10/2016 | Mills | C08F 6/04 |
| 10,221,111 | B2 * | 3/2019 | Kim | C07C 11/06 |

FOREIGN PATENT DOCUMENTS

| | | |
|---|---|---|
| WO | 99/45035 A1 | 9/1999 |
| WO | 99/45036 A1 | 9/1999 |
| WO | 9945035 A1 | 9/1999 |
| WO | 9945036 A1 | 9/1999 |
| WO | 2006/069733 A1 | 7/2006 |
| WO | 2010/052260 A1 | 5/2010 |
| WO | 2010/052263 A1 | 5/2010 |
| WO | 2010/052264 A1 | 5/2010 |
| WO | 2011/087728 A2 | 7/2011 |

* cited by examiner

PROCESS

FIELD OF THE INVENTION

This invention relates to a process for separating hydrogen from a gaseous feed stream in a polymerization process, in particular to a process wherein said gaseous feed stream is contacted with a hydrogen separating membrane. The invention further relates to apparatus arranged to perform the process of the invention and to the use of a hydrogen separating membrane for the separation of hydrogen in the process of the invention.

BACKGROUND

Hydrogen is frequently employed as a reactant (chain transfer agent) in polymerization reactions, particularly those used to prepare polyolefins, to control polymer properties, such as molecular weight. It also affects polymerization rate, although this is further influenced by other factors such as catalyst type, monomers used and process conditions, i.e. temperature and pressure. Hydrogen is also typically produced as a side-product during olefin polymerization. This gas will therefore normally be present in the product reaction mixture.

In solution polymerization reactions employing metallocene catalysts, only tiny amounts of hydrogen are needed to alter polymer properties. This is in contrast to processes using Ziegler-Natta catalysts, which tend to employ higher hydrogen concentrations. Metallocene catalysts are highly sensitive for hydrogen. In general, low concentrations of hydrogen are fed to the reactor which partly react, however an unknown amount of hydrogen may also be produced in the reactor. Upon exit from the polymerization reactor, the effluent is fed to a flash vessel which allows separation of the polymer product and creates a vapor stream comprising, inter alia, any unreacted hydrogen. This is typically recycled back to the polymerization reactor. Since the levels of hydrogen are so low (typically ppm levels) measuring its concentration in the vapor stream is challenging. Moreover, it is not possible to estimate such concentration using mathematical modeling due to the lack of reliable kinetic information in most cases.

Recycling a potential unknown amount of hydrogen back to the reactor as a feed introduces several issues. Most significantly, it can be difficult to control the quality of the produced polymer, resulting in off-spec grades. This can be of particular concern in reactors employing grade transition cycles, which might require the production of low MI products after high-MI products. This also finds practical importance when two or more reactors are connected in parallel or series and where different grades are produced in each reactor with different hydrogen concentrations being required. Separation and removal of the hydrogen from the vapor stream before it is recycled back to the reactor is therefore desirable.

The removal of hydrogen in polymerization processes has been considered, however these focus primarily on conventional low pressure processes, which are usually performed in slurry or gas phase reactors. Temperatures and pressures below 100° C. and 100 bar, respectively, are typically employed in such processes. For example, EP 0905153 considers the removal of hydrogen wherein a hydrogenation catalyst is added into the process stream in between two loop reactors employing Ziegler-Natta polymerization catalysts. The hydrogenation catalyst, typically a metallocene, acts to consume the hydrogen gas, converting it to ethane, prior to entry into a second reactor.

However, this technology does not address the removal of hydrogen from a vapor stream which is intended for recycling back to the polymerization reactor. WO 2011/087728 proposes the use of a spray absorber column in which hydrogen is stripped out using a stripper vapor in a countercurrent flow arrangement. However, this set-up requires the supply of additional materials to the plant in the form of the stripping gas, and furthermore, necessitates the inclusion of a recovery unit where the hydrogen is separated from the stripping gas before it can be further utilized. These add to the cost and complexity of the overall process. There thus remains the need to develop new methods for the removal of hydrogen from gaseous feed streams produced in polymerization processes which overcome at least some of the problems of those presented in the prior art. The present inventors have surprisingly found that employing a hydrogen separating membrane offers an attractive solution to this problem.

It is thus an object of the present invention to provide a new process for separating hydrogen from a gaseous feed stream in a polymerization process which enables effective removal such that a hydrogen-lean gaseous stream may be generated which can be recycled back to the reactor. In particular, a process with high separation efficiency is desirable. A process which can easily be incorporated into existing technologies and plant set-ups is looked-for. Ideally, the process will be more-straightforward and cost effective than those already known in the art. Preferably, more than one of these factors is achieved.

SUMMARY

Thus, in a first aspect, the invention provides a process for separating hydrogen from a gaseous feed stream in a polymerization process, comprising the steps:

i. polymerizing an olefin monomer and optionally at least one olefin comonomer in the presence of a solvent, optionally in the presence of hydrogen, so as to form a polymerization reaction mixture comprising a polyolefin polymer, unreacted monomer(s), solvent and hydrogen;

ii. separating said polyolefin polymer from said unreacted monomer(s), solvent and hydrogen;

iii. feeding said unreacted monomer(s), solvent and hydrogen to a separator so as to form said gaseous feed stream;

iv. contacting said gaseous feed stream with a hydrogen separating membrane so as to form a hydrogen-rich gaseous stream and a hydrogen-lean gaseous stream.

In a further aspect, the invention provides a process as hereinbefore defined, wherein said polymerization process is a solution polymerization process.

In a second aspect, the invention provides the use of a hydrogen separating membrane for the separation of hydrogen in a process as hereinbefore defined.

In a third aspect, the invention provides apparatus arranged to perform the process as hereinbefore defined comprising:

a) At least one reactor configured to receive an olefin monomer, solvent and optionally at least one olefin comonomer, and optionally hydrogen, via at least one first inlet so as to produce a polymerization reaction mixture comprising a polyolefin polymer, unreacted monomer(s), solvent and hydrogen;

b) A first separator in fluid communication with said reactor configured to receive said polymerization reaction mixture via at least one second inlet so as to separate said polyolefin polymer from said unreacted monomer(s), solvent and hydrogen;

c) A second separator in fluid communication with said first separator configured to receive said unreacted monomer(s), solvent and hydrogen via at least one third inlet so as to produce a gaseous feed stream; and d) A membrane contactor in fluid communication with said second separator configured to receive said gaseous feed stream via at least one fourth inlet so as to produce a hydrogen-rich gaseous stream and a hydrogen-lean gaseous stream.

In another aspect, the invention provides a process for controlling the molecular weight of a polyolefin polymer comprising the comprising the steps:

i. polymerizing an olefin monomer and optionally at least one olefin comonomer in the presence of a solvent, optionally in the presence of hydrogen, so as to form a polymerization reaction mixture comprising a polyolefin polymer, unreacted monomer(s), solvent and hydrogen;

ii. separating said polyolefin polymer from said unreacted monomer(s), solvent and hydrogen;

iii. feeding said unreacted monomer(s), solvent and hydrogen to a separator so as to form said gaseous feed stream;

iv. contacting said gaseous feed stream with a hydrogen separating membrane so as to form a hydrogen-rich gaseous stream and a hydrogen-lean gaseous stream.

v. recycling the hydrogen-lean gaseous stream from step iv to step i.

DETAILED DESCRIPTION

Definitions

By polypropylene is meant a polymer containing at least 70 wt % of propylene residues, preferably at least 80 wt % of propylene residues. Any comonomer present in a polypropylene of the invention is another alpha olefin.

By polyethylene is meant a polymer containing at least 50 wt % of ethylene residues, preferably at least 60 wt % of ethylene residues. Any comonomer present in a polyethylene of the invention is another alpha olefin.

Polyolefin

The processes of the invention comprise a first step in which an olefin monomer and optionally at least one comonomer, in the presence of a solvent (typically a mixture of hydrocarbons) are polymerized (optionally in the presence of hydrogen) so as to form a polymerization reaction mixture comprising a polyolefin polymer, unreacted monomer(s), solvent and hydrogen. Where herein it is referred to a polyolefin this means both a homo- and copolymer, e.g. a homopolymer and copolymer of an olefin, such as a homopolymer and copolymer ethylene. The polyolefin copolymer may contain one or more comonomer(s).

As well known "comonomer" refers to copolymerizable comonomer units.

The polyolefin is preferably selected from a polypropylene (PP) or polyethylene (PE), preferably from a polyethylene. For polyethylene, ethylene will form the major monomer content present in any polyethylene polymer.

Preferably, the polyolefin is a polyethylene. Thus, it follows that the preferred olefin monomer of the invention is ethylene.

In case a polyolefin is a copolymer of ethylene with at least one comonomer, then such comonomer(s) is selected from non-polar comonomer(s) or polar comonomers, or any mixtures thereof. Preferable optional non-polar comonomers and polar comonomers are described below. These comonomers can be used in any polyolefin of the invention.

The polyolefin is typically one prepared in the presence of an "olefin polymerization catalyst", which is preferably a conventional coordination catalyst. It is preferably selected from a Ziegler-Natta catalyst, single site catalyst (which term encompasses a metallocene and a non-metallocene catalyst), or a chromium catalyst, or any mixture thereof. The terms have a well-known meaning.

More preferably, the polyolefin is selected from a homopolymer or a copolymer of ethylene produced in the presence of a coordination catalyst.

Where the polyolefin is a polyethylene (PE), then such PE is preferably selected from a very low density ethylene copolymer (VLDPE), a linear low density ethylene copolymer (LLDPE), a medium density ethylene copolymer (MDPE) or a high density ethylene homopolymer or copolymer (HDPE). These well known types are named according to their density area. The term VLDPE includes herein polyethylenes which are also known as plastomers and elastomers and covers the density range of from 850 to 909 kg/m$^3$. The LLDPE has a density of from 909 to 930 kg/m$^3$, preferably of from 910 to 929 kg/m$^3$, more preferably of from 915 to 929 kg/m$^3$. The MDPE has a density of from 930 to 945 kg/m$^3$, preferably 931 to 945 kg/m$^3$. The HDPE has a density of more than 945 kg/m$^3$, preferably of more than 946 kg/m$^3$, preferably from 946 to 977 kg/m$^3$, more preferably from 946 to 965 kg/m$^3$.

Where the polyolefin is an ethylene copolymer it is typically copolymerized with at least one comonomer selected from C3-20 alpha olefin, more preferably from C4-12 alpha-olefin, more preferably from C4-8 alpha-olefin, e.g. with 1-butene, 1-hexene or 1-octene, or a mixture thereof. The amount of comonomer(s) present in a PE copolymer is from 0.1 to 25 mol %, typically 0.25 to 20 mol %.

It will be appreciated that the polyolefin polymers may contain standard polymer additives. These typically form less than 5 wt %, such as less than 2 wt % of the polymer material. Additives, such as antioxidants, phosphites, cling additives, pigments, colorants, fillers, anti-static agent, processing aids, clarifiers and the like may thus be added during the polymerization process. These additives are well known in the industry and their use will be familiar to the artisan.

Polymerization

For the preparation of the polymers of the present invention polymerization methods well known to the skilled person may be used. Typically, however, a solution polymerization process is employed. In the context of the present invention, "solution polymerization" is intended to mean a process in which all reactants and products (in particular, the polyolefin product) remain in solution. Thus, the polyolefin polymer is soluble in any hydrocarbons present in the mixture (such as solvent, monomer and comonomer), thereby forming a homogenous single phase in the reactor. The skilled worker will appreciate that suitable polymerization conditions may be selected to ensure this solubility. With specific reference to the processes of the invention, therefore, the polymerization reaction mixture produced in step i. is a homogenous single phase.

The "solution" processes of the invention may thus be contrasted with "slurry" processes which are typically carried out in loop reactors. For slurry reactors, the reaction temperature will generally be in the range 60 to 110° C., e.g. 85-110° C., the reactor pressure will generally be in the range 5 to 80 bar, e.g. 50-65 bar, and the residence time will generally be in the range 0.3 to 5 hours, e.g. 0.5 to 2 hours. The diluent used will generally be an aliphatic hydrocarbon having a boiling point in the range −70 to +100° C., e.g. propane. In such reactors, the polyolefin product forms a separate phase in the reactor and does not remain in solution. Thus, in a preferable embodiment, the processes of the invention are used to separate hydrogen from a gaseous feed stream in a solution polymerization process.

Polymerization conditions will be dependent on several factors, such as the olefin monomer(s) used, and the skilled person will appreciate how to select the most appropriate conditions. Temperatures of at least 140° C. are generally used, such as 140 to 300° C., preferably 150 to 250° C. Typical pressures are in the range 40 to 150 bar.

In all embodiments, the polymerization is typically carried out in a single reactor. Alternatively, two or more reactors configured either in parallel or series may be employed. Any suitable conventional reactor may be used, such as a stirred tank reactor.

Step i. of the processes of the invention is preferably carried out in the presence of a polymerization catalyst, such as a Ziegler-Natta or single-site catalyst, such as a metallocene. Most preferably, the catalyst is a metallocene Any ordinary stereospecific Ziegler-Natta catalysts can be used. An essential component in those catalysts are solid catalyst components comprising a titanium compound having at least one titanium-halogen bond, an internal electron donor compound and a magnesium halide in active form as a carrier for both the titanium component and the donor compound. The catalysts may contain—as internal electron donor—compounds selected from ethers, ketones, lactones, compounds containing N, P and/or S atoms and esters of mono and dicarboxylic acids.

Any metallocene catalyst capable of catalyzing the formation of an olefinic polymer can also be used. A suitable metallocene catalyst comprises a metallocene/activator reaction product impregnated in a porous support at maximum internal pore volume. The catalyst complex comprises a ligand which is typically bridged, and a transition metal of group IVa to VIa, and an organoaluminum compound. The catalytic metal compound is typically a metal halide.

Suitable metallocene compounds are those which have a formula $(Cp)_m R_n MR'_o X_p$, where Cp is an unsubstituted or substituted and/or fused homo or heterocyclopentadienyl, R is a group having 1-4 atoms and bridging two Cp rings, M is a transition metal of group 4, 5 or 6 in the Periodic Table of Elements (IUPAC, 1985), R' is $C_1$-$C_2$ hydrocarbyl or hydrocarboxy group and X is a halogen atom, wherein m is 1-3, n is 0 or 1, o is 0-3 and p is 0-3 and sum n+o+p corresponds the oxidation state of the transition metal M. The transition metal M is preferably zirconium, hafnium or titanium, most preferably hafnium. Examples from suitable metallocene compounds are, among others, (phenyl)(but-3-en-1-yl)methylene(cyclopentadienyl)(2,7-di-tert-butylfluoren-9-yl)hafnium dimethyl,
(phenyl)(but-3-en-1-yl)methylene(cyclopentadienyl)(2,7-di-tert-butylfluoren-9-yl)hafnium dibenzyl,
(phenyl)(but-3-en-1-yl)methylene(cyclopentadienyl)(2,7-di-tert-butylfluoren-9-yl)hafnium dichloride,
(phenyl)(4-penten-1-yl)methylene(cyclopentadienyl)(2,7-di-tert-butylfluorenyl)hafnium dimethyl,
(phenyl)(4-penten-1-yl)methylene(cyclopentadienyl)(2,7-di-tert-butylfluorenyl)hafnium dibenzyl,
(phenyl)(4-penten-1-yl)methylene(cyclopentadienyl)(2,7-di-tert-butylfluorenyl)hafnium dichloride,
(phenyl)(5-hexen-1-yl)methylene(cyclopentadienyl)(2,7-di-tert-butylfluoren-9-yl)hafnium dimethyl,
(phenyl)(5-hexen-1-yl)methylene(cyclopentadienyl)(2,7-di-tert-butylfluoren-9-yl)hafnium dibenzyl,
(phenyl)(5-hexen-1-yl)methylene(cyclopentadienyl)(2,7-di-tert-butylfluoren-9-yl)hafnium dichloride,
(phenyl)(3-phenylpropyl)methylene(cyclopentadienyl)(2,7-di-tert-butylfluoren-9-yl)hafnium dichloride,
(phenyl)(3-phenylpropyl)methylene(cyclopentadienyl)(2,7-di-tert-butylfluoren-9-yl)hafnium dimethyl,
(phenyl)(3-phenylpropyl)methylene(cyclopentadienyl)(2,7-di-tert-butylfluoren-9-yl)hafnium dibenzyl,
(phenyl)(cyclohexyl)methylene(cyclopentadienyl)(2,7-di-tert-butylfluoren-9-yl)hafnium dichloride
(phenyl)(cyclohexyl)methylene(cyclopentadienyl)(2,7-di-tert-butylfluoren-9-yl)hafnium dimethyl
(phenyl)(cyclohexyl)methylene(cyclopentadienyl)(2,7-di-tert-butylfluoren-9-yl)hafnium dibenzyl
(phenyl)(cyclopentyl)methylene(cyclopentadienyl)(2,7-di-tert-butylfluoren-9-yl)hafnium dichloride
(phenyl)(cyclopentyl)methylene(cyclopentadienyl)(2,7-di-tert-butylfluoren-9-yl)hafnium dimethyl
(phenyl)(cyclopentyl)methylene(cyclopentadienyl)(2,7-di-tert-butylfluoren-9-yl)hafnium dibenzyl
(phenyl)(cyclobutyl)methylene(cyclopentadienyl)(2,7-di-tert-butylfluoren-9-yl)hafnium dichloride
(phenyl)(cyclobutyl)methylene(cyclopentadienyl)(2,7-di-tert-butylfluoren-9-yl)hafnium dimethyl
(4-isopropylphenyl)(cyclohexyl)methylene(cyclopentadienyl)(2,7-di-tert-butylfluoren-9-yl)hafnium dichloride
(4-isopropylphenyl)(cyclohexyl)methylene(cyclopentadienyl)(2,7-di-tert-butylfluoren-9-yl)hafnium dimethyl
(4-isopropylphenyl)(cyclopentyl)methylene(cyclopentadienyl)(2,7-di-tert-butylfluoren-9-yl)hafnium dichloride
(4-isopropylphenyl)(cyclopentyl)methylene(cyclopentadienyl)(2,7-di-tert-butylfluoren-9-yl)hafnium dimethyl
(4-isopropylphenyl)(cyclobutyl)methylene(cyclopentadienyl)(2,7-di-tert-butylfluoren-9-yl)hafnium dichloride
(4-isopropylphenyl)(cyclobutyl)methylene(cyclopentadienyl)(2,7-di-tert-butylfluoren-9-yl)hafnium dimethyl
(3,5-di-isopropylphenyl)(cyclohexyl)methylene(cyclopentadienyl)(2,7-di-tert-butylfluoren-9-yl)hafnium dichloride
(3,5-di-isopropylphenyl)(cyclohexyl)methylene(cyclopentadienyl)(2,7-di-tert-butylfluoren-9-yl)hafnium dimethyl
(3,5-di-isopropylphenyl)(cyclopentyl)methylene(cyclopentadienyl)(2,7-di-tert-butylfluoren-9-yl)hafnium dichloride
(3,5-di-isopropylphenyl)(cyclopentyl)methylene(cyclopentadienyl)(2,7-di-tert-butylfluoren-9-yl)hafnium dimethyl
(3,5-di-isopropylphenyl)(cyclobutyl)methylene(cyclopentadienyl)(2,7-di-tert-butylfluoren-9-yl)hafnium dichloride
(3,5-di-isopropylphenyl)(cyclobutyl)methylene(cyclopentadienyl)(2,7-di-tert-butylfluoren-9-yl)hafnium dimethyl Such metallocene catalysts are frequently used with catalyst activators or co-catalysts, e.g. alumoxanes such as methylaluminoxane, which are widely described in the literature.

The metallocene catalyst may be supported as is well known in the art. Any suitable support or carrier material can be used, which may be any porous, substantially inert support, such as an inorganic oxide or salt. In practice the support used is preferably a fine-grained inorganic oxide such as an inorganic oxide of an element of Group 2, 13 or 14 in the Periodic Table of Elements (IUPAC, 1985), most preferably silica, alumina or a mixture or derivative of these. Other inorganic oxides which can be used either alone or together with silica, alumina or silica-alumina, are magnesium oxide, titanium dioxide, zirconium oxide, aluminum phosphate etc.

Alternatively, the catalyst may be used in non-supported form or in solid form.

Non-supported catalyst systems, suitable for the present invention can be prepared in solution, for example in an aromatic solvent like toluene, by contacting the metallocene (as a solid or as a solution) with the cocatalyst(s), for example methylaluminoxane and/or a borane or a borate salt previously in an aromatic solvent, or can be prepared by sequentially adding the dissolved catalyst components to the polymerization medium.

The catalyst system of the invention in solid form, preferably in solid particulate form is free from an external carrier, however still being in solid form. By free from an external carrier is meant that the catalyst does not contain an external support, such as an inorganic support, for example, silica or alumina, or an organic polymeric support material.

In order to provide the catalyst system of the invention in solid form but without using an external carrier, it is preferred if a liquid/liquid emulsion system is used. The process involves forming dispersing catalyst components (i) (the complex) and (ii)+optionally (iii) the cocatalysts) in a solvent, and solidifying said dispersed droplets to form solid particles. In particular, the method involves preparing a solution of the catalyst components; dispersing said solution in an solvent to form an emulsion in which said one or more catalyst components are present in the droplets of the dispersed phase; immobilizing the catalyst components in the dispersed droplets, in the absence of an external particulate porous support, to form solid particles comprising the said catalyst, and optionally recovering said particles. This process enables the manufacture of active catalyst particles with improved morphology, e.g. with a predetermined particle size, spherical shape, compact structure, excellent surface properties and without using any added external porous support material, such as an inorganic oxide, e.g. silica. The catalyst particles can have a smooth surface, they may be compact in nature and catalyst active components can be distributed uniformly thorough the catalyst particles. Full disclosure of the necessary process steps can be found in, for example, WO03/051934.

All or part of the preparation steps can be done in a continuous manner Reference is made to WO2006/069733 describing principles of such a continuous or semicontinuous preparation methods of the solid catalyst types, prepared via emulsion/solidification method. The formed catalyst preferably has good stability/kinetics in terms of longevity of reaction, high activity and the catalysts enable low ash contents.

The use of the heterogeneous, non-supported catalysts, (i.e. "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization which may cause melting of the product material. Both effects, i.e. the partial dissolving of the catalyst system and the heat generation, might cause fouling, sheeting and deterioration of the polymer material morphology.

In order to minimize the possible problems associated with high activity or leaching, it is preferred to "prepolymerize" the catalyst before using it in polymerization process. It has to be noted that prepolymerization in this regard is part of the catalyst preparation process, being a step carried out after a solid catalyst is formed. This catalyst prepolymerization step is not part of the actual polymerization configuration, which might comprise a conventional process prepolymerization step as well. After the catalyst prepolymerization step, a solid catalyst is obtained and used in polymerization.

Catalyst "prepolymerization" takes place following the solidification step of the liquid-liquid emulsion process hereinbefore described. Prepolymerization may take place by known methods described in the art, such as that described in WO 2010/052263, WO 2010/052260 or WO 2010/052264. Use of the catalyst prepolymerization step offers the advantage of minimizing leaching of catalyst components and thus local overheating.

The solvent employed in the processes of the invention may be any solvent suitable for use in olefin polymerization and is typically a mixture of hydrocarbons. Such solvents are well known in the art. Examples of solvents include hexane, cyclohexane, isohexane, n-heptane, C8, C9 isoparaffins and mixtures thereof.

In one embodiment, the polymerization is carried out in the presence of hydrogen. Hydrogen is typically employed to help control polymer properties. In an alternative embodiment, hydrogen is not added in step i. The skilled worker will appreciate, however, that hydrogen may be generated during the polymerization process. Thus, the hydrogen present in the polymerization reaction mixture formed in step i. of the process may originate from hydrogen which has been added as a reactant and/or hydrogen produced as a side product during polymerization.

In step ii. of the process, the polyolefin is separated from any unreacted monomer(s) and hydrogen so as to produce a gaseous feed stream comprising unreacted monomer(s), solvent and hydrogen. This separation may be carried out by any suitable method known in the art, however typically it will be performed by flash evaporation (also known as flash distillation) in a flash separator or by gravimetric separation. In flash separation processes, the polyolefin remains as a liquid stream and a vapor stream is produced comprising the more volatile components including unreacted monomer(s), solvent and hydrogen. That vapor stream may also comprise additional materials, such as solvent and inert gases.

Step iii. of the process of the invention involves feeding said vapor stream comprising unreacted monomer(s), solvent and hydrogen to a separator, such as a condenser, so as to form the gaseous feed stream from which hydrogen can subsequently be separated from. The separator serves to separate out anything which is non-gaseous, such as polymer droplets, comonomers (and, if present, solvent). Such a step is routine in polymerization processes used in industry and will be familiar to the skilled worker. As such, any suitable separator may be used in this step. A condenser is a preferable separator for use in this step. The vapor stream which exits the separator is termed the "gaseous feed stream" herein. The gaseous feed stream comprises unreacted monomer(s), solvent and hydrogen. It will be understood that additional components may also be present, which could include side-products produced during the polymerization reaction. For example, when butene is used as a comonomer, components such as iso-butene, 2-butene and butane may also be present in the gaseous feed stream. Hydrogen is typically present in the gaseous fed stream in amounts of 0.1 to 1000 ppm, such as 1.0 to 500 ppm.

Separation of Hydrogen

In the context of the present invention, the term "separation" of hydrogen is intended to cover any degree of removal of hydrogen from the feed stream. Thus, it may be considered to encompass the complete removal of hydrogen as well as a reduction in the amount (e.g. concentration) of hydrogen in the feed stream Step iv. of the process of the invention involves contacting the gaseous feed stream produced in step iii. with a hydrogen separating membrane so as to form a hydrogen-rich gaseous stream and a hydrogen-lean gaseous stream. By "hydrogen separating membrane" we mean any membrane which is capable of effectively separating hydrogen from the other components in the gaseous feed stream.

Whilst it is within the ambit of the invention for the process to involve the use of multiple membranes, it is preferred if the process, in particular step iv of the process, employs a single hydrogen separating membrane. Thus, in such an embodiment, the gaseous feed stream produced in step iii. is contacted with a single hydrogen separating membrane.

Membrane technologies for separating hydrogen are known in the art and are commercially available from suppliers such as Air Liquide, Membrane Technology & Research, Inc. and Air Products.

The membrane may be porous or non-porous, typically porous. By "porous" we mean that the membrane contains pores. The pores are typically micropores, having a diameter of 2 nm or less, or mesopores, having a diameter of 2 to 100 nm. Preferably, the membrane contains micropores. Highly gas permeable non-porous membranes may also be used.

The membrane may be multilayer or monolayer. For a non-porous membrane, the non-porous layer of the membrane will preferably have a thickness of 1 to 2000 nm, more preferably 10-1000 nm, even more preferably 25-500 nm. For a porous membrane, the membrane will preferably have a thickness of 1 to 500 µm, more preferably 10-300 µm, even more preferably 25-200 µm, depending on the types of the membrane materials and fabrication techniques.

Typically, the membrane will have a packing density of 300 to 30000 $m^2/m^3$, preferably 1500 to 3000 $m^2/m^3$.

Many different types of membranes known in the art would be suitable for use in the present invention. In a preferred embodiment, the membrane is a polymeric or inorganic membrane. In an alternative embodiment, the membrane may be a metallic membrane such as a palladium or palladium alloy membrane. Example inorganic membranes include silica membranes, zeolite and carbon membranes such as carbon nanotubes. Membranes which comprise an inorganic material, such as silica, coated on a porous material, could also be used. Example polymeric membranes include those comprising polypropylene (PP), polyethylene (PE), polycarbonate (PCTE), poly(methyl methacrylate) (PMM), poly(l-trimethylsilyl-1-propyne) (PTMSP), polyetetrafluoroethylene (PTFE) or polyvinylidene fluoride (PVDF), as well as other hydrophobic fluromembranes. The polymeric membrane may be cross-linked or non-cross-linked. In one preferable embodiment, the polymeric membrane is a hollow fiber membrane. It is also within the ambit of the invention for the membrane to be a multilayer composite membrane with layers of differing material, such as those described above. The membrane may also comprise a support layer.

In some embodiments, the membrane is preferably non-selective for hydrogen. By "non-selective" we mean that the membrane does not allow only hydrogen to pass through it, but rather permits the passage of many different types of molecules. This has the advantage that the membranes have lower mass transfer resistance, and the membranes are generally cheaper than the more traditionally used selective membranes which are chosen to selectively allow the passage of only a single gas. In non-selective membranes, the "fast gases," or gases with a higher permeation rate, permeate through the membrane into the hollow interior and are channeled into the permeate stream. Simultaneously, the "slower gases" flow around the fibers and into the residue stream. Thus, in the context of the present invention, separation may be achieved as a result of the faster diffusion of hydrogen compared to the other components in the gaseous feed stream, such as ethylene and ethane. Hollow fiber polymeric membranes are an example of "non-selective" membranes.

The separation efficiency (i.e. the efficiency of hydrogen removal) of step iv. of the processes of the invention is preferably at least 75%, preferably at least 80%, such as at least 90%. The hydrogen-lean gaseous stream produced in step iv. typically comprises hydrogen in amounts of less than 5 ppm, preferably less than 2 ppm, more preferably less than 0.5 ppm.

The hydrogen-rich gaseous stream produced in step iv. typically comprises at least 90 wt % hydrogen, preferably at least 95 wt % hydrogen, such as at least 99 wt % hydrogen, relative to the total weight of the gaseous stream. Thus, the hydrogen-rich gaseous stream ideally comprises at most very low levels of other components such as light hydrocarbons (e.g. ethylene, methane and/or ethane). For example, preferable levels of light hydrocarbons in the hydrogen-rich gaseous stream are less than 5 ppm, preferably less than 2 ppm, more preferably less than 0.5 ppm.

In one embodiment, the hydrogen-lean gaseous stream is recycled back to the polymerization reactor. Thus, the processes of the invention can be incorporated into continuous polymerization processes where it is desired that the hydrogen-lean gaseous stream produced after separation from the polyolefin product is recycled to be used as further reactant. Equally, the hydrogen-rich gaseous stream may be fed back to the reactor in circumstances where this is desired. Incorporation into existing industrial polymerization plant set-ups is therefore possible and relatively facile.

Apparatus

In a further aspect, the invention provides apparatus arranged to perform the process as hereinbefore defined comprising:
 a) At least one reactor configured to receive an olefin monomer and optionally at least one olefin comonomer, solvent and optionally hydrogen via at least one first inlet so as to produce a polymerization reaction mixture comprising a polyolefin polymer, unreacted monomer(s), solvent and hydrogen;
 b) A first separator in fluid communication with said reactor configured to receive said polymerization reaction mixture via at least one second inlet so as to separate said polyolefin polymer from said unreacted monomer(s), solvent and hydrogen;
 c) A second separator in fluid communication with said first separator configured to receive said unreacted monomer(s) and hydrogen via at least one third inlet so as to produce a gaseous feed stream; and d) A membrane contactor in fluid communication with said second separator configured to receive said gaseous feed stream via at least one fourth inlet so as to produce a hydrogen-rich gaseous stream and a hydrogen-lean gaseous stream.

All preferable embodiments described above in the context of the processes of the invention apply equally to the apparatus.

In step a) a single reactor is preferably used. Alternatively two or more reactors connected in parallel or series may be employed. Any conventional polymerization reactor may be employed, however this is preferably a reactor suitable for solution polymerization, such as a stirred tank reactor.

The first separator used in step b) may be any suitable separator, but is preferably a flash separator.

The separator in step c) may be any suitable separator, but is preferably a condenser, examples of which are well known in the art.

The membrane contactor in step d) may be any membrane contactor suitable for the separation of hydrogen from the gaseous feed stream. The membrane contactor comprises a membrane as hereinbefore defined. It is preferred if the apparatus of the invention comprises only a single membrane contactor, thus only one membrane contactor is present.

One example of a membrane contactor is one which comprises two regions separated by a membrane interface. In the membrane contactors of the present invention, both regions will generally comprise gaseous components. The two regions are often referred to as the "retentate" and "permeate" sides of the membrane, wherein the "retentate" comprises those components which have not passed though the membrane and the "permeate" side comprises those components which have passed through the membrane.

The gaseous feed stream is passed into the membrane contactor on the retentate side, preferably via an inlet. The purpose of the membrane contactor is to separate hydrogen from the gaseous feed stream. This may be achieved by selective absorption of the hydrogen through the membrane to the permeate side. The remaining components of the gaseous feed stream pass out of the membrane contactor on the retentate side, preferably via an outlet. These components are referred to as the "hydrogen-lean gaseous stream". Some or all of these remaining components may be recycled back to the inlet for further separations, or may be recycled to the polymerization reactor. The permeate comprising hydrogen (known as the hydrogen-rich gaseous stream) is passed out of the membrane contactor and may also be recycled to the polymerization reactor.

Uses

The processes of the invention may be employed in any polymerization process to separate hydrogen from a gaseous feed stream produced therein.

Moreover, as discussed above, because the presence of hydrogen in the polymerization reactor can influence the molecular weight of the resultant polymer, the processes of the invention may also be considered as processes for controlling the molecular weight of a polyolefin polymer. By separating the hydrogen from the gaseous feed stream a "hydrogen-lean gaseous stream" is generated which contains very low levels of hydrogen. When this is recycled to the polymerization reactor, problems such as the generation of off-spec grades are significantly reduced because the possibility of potentially large and unknown levels of hydrogen entering the reactor is minimized Thus, the molecular weight of the polymer can be more precisely controlled.

Thus, in a further embodiment, the invention relates to a process for controlling the molecular weight of a polyolefin polymer comprising the comprising the steps:

i. polymerizing an olefin monomer and optionally at least one olefin comonomer in the presence of a solvent, optionally in the presence of hydrogen, so as to form a polymerization reaction mixture comprising a polyolefin polymer, unreacted monomer(s), solvent and hydrogen;

ii. separating said polyolefin polymer from said unreacted monomer(s), solvent and hydrogen;

iii. feeding said unreacted monomer(s), solvent and hydrogen to a separator so as to form said gaseous feed stream;

iv. contacting said gaseous feed stream with a hydrogen separating membrane so as to form a hydrogen-rich gaseous stream and a hydrogen-lean gaseous stream.

v. recycling the hydrogen-lean gaseous stream from step iv to step i.

The invention will now be described with reference to the following non-limiting examples.

EXAMPLES

The following examples are simulations carried out using Aspen Plus V9.

Example 1

A conventional process configuration is considered (see FIG. 1) where a polymerization unit (2) comprising a polymerization reactor is connected to a flash separator (3). Reactor effluent (7) with temperature as low as 160° C. (depending on PE grade), is heated up to around 230° C. before flashing. The outlet stream (9) from the flash separator (3) is 100% vapor at a temperature close to 180° C., the temperature of this stream is reduced finally to around 60° C. using a series of heat exchangers & separators (4). The stream (11) is routed to a feed preparation section (1). The hydrogen in this stream returned (11) is lost via vent (15) in the feed preparation section (1). Along with hydrogen, ethylene monomer is also lost in the vent stream thus affecting economics of the process.

The components of the configuration shown in FIG. 1 are as follows:

(1) Feed preparation
(2) Polymerization unit
(3) Separator #1
(4) Separator #2 (condenser)
(6) Line from feed preparation to polymerization stages
(7) Line from polymerization to separator stages
(8) Outlet from separator containing polyolefin polymer
(9) Line from separator to condenser stages
(10) Liquid stream outlet from condenser
(11) Vapor stream outlet from condenser
(14) Feed line
(15) Vent stream

Example 2

Figure 2:
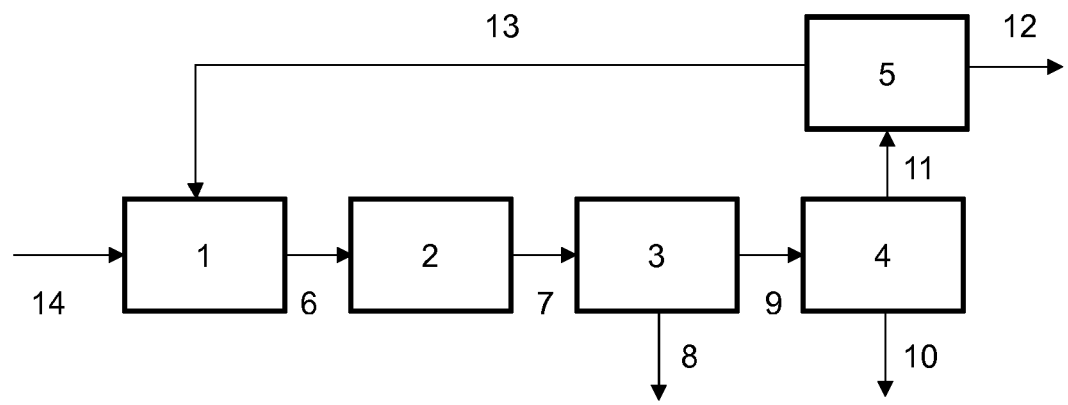

The process in FIG. 1 would be modified by placing a membrane separation unit (MU) on gaseous stream 11 (downstream of separator 4), see FIG. 2. The components in FIG. 2 are as follows:

(1) Feed preparation
(2) Polymerization
(3) Separator #1
(4) Separator #2 (condenser)
(5) Membrane Unit
(6) Line from feed preparation to polymerization stages
(7) Line from polymerization to separator stages
(8) Outlet from separator containing polyolefin polymer
(9) Line from separator to condenser stages
(10) Liquid stream outlet from condenser
(11) Vapor stream outlet from condenser
(12) Hydrogen-rich stream (could also be returned to (1))
(13) Hydrogen lean stream
(14) Feed line The stream 9 has a temperature of approx. 110° C. and 8 Barg In this case, the pressure drop over the MSU is sufficient to remove the hydrogen.

The separator 4 operates such that the outlet stream 11 is cooled to 40° C.

The composition of the stream 11 and the outlet streams (12 & 13) from the membrane unit (assuming 90% $H_2$ separation in a clean membrane) are given in Table 1.

TABLE 1

Selected streams compositions, stream numbers as in FIG. 2

| Stream Components flow rate, Kg/hr | 9 | 11 | After MU, hydrogen-lean stream (13) | After MU, hydrogen-rich stream (12) |
|---|---|---|---|---|
| $H_2$ | 0.57 | 0.57 | 0.04 | 0.53 |
| Methane | 10.4 | 10.1 | 10.1 | 0 |
| Ethylene | 1420 | 1288 | 1288 | 0 |
| Ethane | 37 | 32 | 32 | 0 |
| Hexane | 2018 | 0 | 0 | 0 |
| 1-Octene | 1496 | 0 | 0 | 0 |
| Total mass flow | 4981.97 | 1330.67 | 1330.15 | 0.53 |

The invention claimed is:

1. A process for separating hydrogen from a gaseous feed stream in a polymerization process, comprising the steps:
   i. polymerizing an olefin monomer and optionally at least one olefin comonomer, in the presence of a solvent, optionally in the presence of hydrogen, to form a polymerization reaction mixture comprising a polyolefin polymer, unreacted monomer(s), solvent and hydrogen;
   ii. separating said polyolefin polymer from said unreacted monomer(s), solvent and hydrogen;
   iii. feeding said unreacted monomer(s), solvent and hydrogen to a separator to form said gaseous feed stream;
   iv. contacting said gaseous feed stream with a single hydrogen separating membrane to form a hydrogen-rich gaseous stream and a hydrogen-lean gaseous stream, wherein a separation efficiency of step iv. is at least 75%.

2. The process as claimed in claim 1, wherein said polymerization process is a solution polymerization process.

3. The process as claimed in claim 1, further comprising
   v. recycling the hydrogen-lean gaseous stream from step iv to step i.

4. The process as claimed in claim 1, wherein said polyolefin is polyethylene.

5. The process as claimed in claim 4, wherein said polyethylene is a polyethylene homopolymer or a polyethylene copolymer of ethylene and at least one alpha-olefin comonomer.

6. The process as claimed in claim 5, wherein the at least one alpha-olefin comonomer comprises a C3-C8 alpha-olefin comonomer.

7. The process as claimed in claim 1, wherein step i. is carried out in the presence of a polymerization catalyst.

8. The process as claimed in claim 1, wherein the separation efficiency of step iv. is at least 80%.

9. The process as claimed in claim 1, wherein said membrane is a polymeric or inorganic membrane.

10. An apparatus arranged to perform the process as defined in claim 1 comprising:
    a) at least one reactor configured to receive an olefin monomer and optionally at least one olefin comonomer, solvent and optionally hydrogen via at least one first inlet to produce a polymerization reaction mixture comprising a polyolefin polymer, unreacted monomer(s), solvent and hydrogen;
    b) a first separator in fluid communication with said reactor configured to receive said polymerization reaction mixture via at least one second inlet to separate said polyolefin polymer from said unreacted monomer(s), solvent and hydrogen;
    c) a second separator in fluid communication with said first separator configured to receive said unreacted monomer(s), solvent and hydrogen via at least one third inlet to produce a gaseous feed stream; and
    d) a single membrane contactor in fluid communication with said second separator configured to receive said gaseous feed stream via at least one fourth inlet to produce a hydrogen-rich gaseous stream and a hydrogen-lean gaseous stream, wherein a separation efficiency is at least 75%.

11. A process for controlling molecular weight of a polyolefin polymer comprising the steps:
    i. polymerizing an olefin monomer and optionally at least one olefin comonomer in the presence of a solvent, optionally in the presence of hydrogen, to form a polymerization reaction mixture comprising a polyolefin polymer, unreacted monomer(s), solvent and hydrogen;
    ii. separating said polyolefin polymer from said unreacted monomer(s), solvent and hydrogen;
    iii. feeding said unreacted monomer(s), solvent and hydrogen to a separator to form said gaseous feed stream;
    iv. contacting said gaseous feed stream with a single hydrogen separating membrane to form a hydrogen-rich gaseous stream and a hydrogen-lean gaseous stream, wherein a separation efficiency of step iv. is at least 75%; and
    v. recycling the hydrogen-lean gaseous stream from step iv to step i.

12. The process as claimed in claim 7, wherein the polymerization catalyst is a metallocene catalyst.

13. The process as claimed in claim 1, wherein the separation efficiency of step iv. is at least 90%.

* * * * *